United States Patent
Dobos

(10) Patent No.: US 7,165,752 B2
(45) Date of Patent: Jan. 23, 2007

(54) CUP HOLDER WITH DOUBLE BALANCE

(75) Inventor: Leonhard Dobos, Kroening (DE)

(73) Assignee: Lisa Draxlmaier GmbH, Vilsbiburg (DE)

( * ) Notice: Subject to any disclaimer, the term of this patent is extended or adjusted under 35 U.S.C. 154(b) by 0 days.

(21) Appl. No.: 11/038,142

(22) Filed: Jan. 21, 2005

(65) Prior Publication Data

US 2005/0184209 A1 Aug. 25, 2005

(30) Foreign Application Priority Data

Jan. 22, 2004 (DE) .................... 10 2004 003 349

(51) Int. Cl.
*A47K 1/08* (2006.01)
(52) U.S. Cl. .................. 248/311.2; 224/282; 248/316.3
(58) Field of Classification Search ............ 248/311.2, 248/314, 315, 316.7, 316.1, 309.1, 309.2, 248/316.5, 316.3, 318; 297/188.01; 224/282, 224/926
See application file for complete search history.

(56) References Cited

U.S. PATENT DOCUMENTS

| | | | | |
|---|---|---|---|---|
| 4,919,381 A | * | 4/1990 | Buist ........................... | 248/154 |
| 5,154,380 A | * | 10/1992 | Risca ........................... | 248/154 |
| 5,860,559 A | * | 1/1999 | Wang ........................... | 220/737 |
| 5,878,986 A | * | 3/1999 | Sun et al. ..................... | 248/311.2 |
| 6,637,709 B1 | * | 10/2003 | Guenther et al. .......... | 248/311.2 |
| 6,692,053 B1 | * | 2/2004 | Smith ........................ | 296/37.1 |
| 6,705,580 B1 | * | 3/2004 | Bain .......................... | 248/311.2 |
| 6,749,167 B1 | * | 6/2004 | Kaupp et al. ............. | 248/311.2 |
| 2002/0063192 A1 | * | 5/2002 | Porcelli .................... | 248/311.2 |

FOREIGN PATENT DOCUMENTS

| | | |
|---|---|---|
| DE | 296 06 583 U1 | 11/1997 |
| DE | 197 29 689 A1 | 1/1999 |
| DE | 299 20 019 U1 | 2/2000 |
| DE | 10121979 * | 5/2001 |
| DE | 201 08 250 U1 | 10/2002 |
| DE | 202 19 606 U1 | 6/2004 |

* cited by examiner

*Primary Examiner*—Carl D. Friedman
*Assistant Examiner*—Tan Le
(74) *Attorney, Agent, or Firm*—Sughrue Mion, PLLC

(57) ABSTRACT

The invention relates to a holding device (1), preferably for storing drinks containers (12), particularly for use in motor vehicles, with a receptacle (4) having a supporting surface (11) for the drinks container (12) and at least one holding mechanism arranged on the outer circumference of the receptacle (4) whereby the holding mechanism has at least one movable element (3) essentially pressed by the spring element (2) towards the inside of the receptacle (4) characterized in that the movable element (3) rotates on bearings around an axis (10) on the receptacle (4), the receptacle (4) has a contact surface (9) for the movable element (3), and the movable element (3) has a preferably domed flexible surface (6) that extends at least partially into the receptacle (4).

11 Claims, 2 Drawing Sheets

CUP HOLDER WITH DOUBLE BALANCE

FIELD OF THE INVENTION

The invention relates to a holding device, preferably for storing drinks containers, particularly for use in motor vehicles, with a receptacle and at least one holding mechanism arranged on the outer circumference of the receptacle whereby the holding mechanism has at least one spring element and at least one movable element essentially pressed by the spring element towards the inside of the receptacle.

PRIOR ART

Particularly in motor vehicles, fold-out holding devices for drinks containers, especially bottles, jars or drinks cans, are normally provided in the area of the central console, the central arm rests or in door or seat panels. On one hand these holding devices must have a certain amount of dimensional stability so that they can store even full drinks containers safely and can safely prevent opened drinks containers from falling over. The holding devices are normally cylindrical in shape and have a supporting surface and a wall normally arranged at a distance so as to surround the supporting surface.

In this case the holding devices must be able to take a large number of different drinks containers with various diameters and be able to store and support them with virtually the same degree of security. A holding device is known from DE 101 21 979 A1 for a container to be carried in a vehicle in which a drinks can is held by means of pre-tensioned clip elements and is essentially centred within a receptacle that has at least two sides. However, this holding device only offers a clamping mechanism designed with one stage for drinks cans which allows for no further adaptation to the geometry of the drinks can beyond the gripping mechanism particularly if using containers that are not cylindrical.

DESCRIPTION OF THE INVENTION

Therefore, it was an object of the invention to provide a holding device that does not have the problems known from the prior art, preferably for storing drinks containers, especially for use in motor vehicles, with a receptacle having a supporting surface for the drinks container and at least one holding mechanism arranged on the outer circumference of the receptacle.

In this case the invention is based on the idea that a holding device designed with a two-stage holding mechanism can serve to secure drinks containers of the most diverse diameters whereby drinks containers with particularly small diameters will only be held for example by using a first securing stage whilst drinks containers with particularly large diameters on the other hand will be held by using both securing stages that preferably act on each other in succession.

A holding device is provided in which a holding mechanism has at least one spring element and at least one movable element essentially pressed by the spring element towards the inside of the receptacle. In this case the movable element is arranged to rotate around an axis on the receptacle whereby the receptacle has a contact surface for the movable element. The movable element has a flexible, preferably domed, surface projecting at least partially into the receptacle.

The holding mechanism's desired multi-stage balance on the geometry of the drinks container to be held is achieved in this case in that the force required for moving the spring element is matched to the force required for the change in shape of the movable element's flexible surface.

This ensures that it is possible to create a two-stage balance of the holding mechanism on the geometry of the drinks container whereby the first balance is achieved for example by the spring force exerted by the spring element against the drinks container and a second balance is not created until the spring element has been deflected completely by a change in shape of the movable element's flexible surface.

Likewise, in a manner according to the invention, a two-stage balance is ensured if a first balance is achieved by means of a change in shape of the movable element's flexible surface and a second balance is not created until a complete change in shape of the flexible surface has been achieved by means of the spring force exerted by the spring element against the drinks container.

Finally, according to the manner of the invention, a two-stage balance is also ensured if the first and second balance is achieved simultaneously due to the spring forces of the spring element and of the flexible surface that are designed to be identical.

In a surprisingly simple manner this results in the creation of a holding device that is able to store drinks containers with even a small diameter in the holding device in a conventional way, for example by gripping with one or more spring elements, but that over and above this can locate, and very preferably centre, drinks containers with very large diameters for example or with geometries deviating from the cylindrical shape by means of a second element of the holding mechanism.

In a first preferred embodiment of the holding device according to the invention, the receptacle has an essentially cylindrical shape. A cylindrical shape of this type is also in evidence if the described interior alone of the receptacle is essentially cylindrical whereas the external shape of the overall holding device can clearly deviate from this cylindrical shape. Furthermore, according to the manner of the invention, a cylindrical form also exists if the receptacle does not circumscribe the entire circumference of the cylinder but only encompasses part of the cylinder's circumference, preferably in excess of 180°. This results in the creation of a receptacle that is adapted in a particularly advantageous manner to the cylindrical shape normally found in drinks containers.

In a further preferred embodiment of the invention the receptacle does not have a side wall or side walls made from a solid material but has a frame-like structure that is made up of one or more horizontal and vertical struts. This provides a receptacle that is particularly economical of materials and also clearly simplifies cleaning of the holding device.

In a further preferred embodiment of the holding device according to the invention, it has at least two, preferably 3 or 4, holding mechanisms that are preferably identical. In an especially preferred embodiment of the invention, two holding mechanisms are arranged essentially opposite each other in the receptacle. In a further especially preferred embodiment of the invention, more than two holding mechanisms are arranged preferably at essentially the same distance apart on the circumference of the holding device. This results in the creation of a holding device that has a particularly simple construction and furthermore in addition to locating the drinks container it also enables the container to be centred inside the receptacle.

In a further preferred embodiment of the holding device, the spring element is a spring blade that is connected to the receptacle and is pre-stressed towards the inside of the receptacle. In an especially preferred embodiment of the invention, this spring blade is made of plastic and is preferably contoured. Contouring of the spring element is always achieved according to the manner of the invention if the spring blade is not straight in design but has kinks, bends or similar. This produces a spring element that has an especially simple construction and in which the pre-stressing force remains almost the same throughout the lifetime of the holding device even when it is used frequently.

In a further preferred embodiment of the holding device according to the invention, the spring element supports the movable element from the side facing away from the flexible surface and away from the supporting surface arranged on the receptacle towards the inside of the receptacle. This results in the creation of a holding mechanism that has an especially simple construction and in which the principle of the double balance of the holding mechanism on the geometry of the drinks container to be held is achieved with particular ease by means of the linkage between the spring element and the movable element.

In a further preferred embodiment of the holding device according to the invention, the movable element is attached to the receptacle so as to be rotatable around an axis arranged on the face side of the movable element. In an especially preferred manner, the rotatable axis in this case is arranged on the face side of the movable element. This results in the creation of a device in which the upper end of the movable element is in contact with the receptacle and the lower end of the movable element extends into the receptacle.

This results in the creation of a holding device in which the movable element can be rotated in an especially easy manner by inserting the drinks container into the receptacle towards the outside, preferably up to the contact surface. When the drinks container is removed, the spring element causes the movable element to rotate back to its starting position.

In a further preferred embodiment of the holding device according to the invention, the flexible surface of the movable element has a segmental arc profile or parabolic convex dome. This provides a flexible element that is especially easy to manufacture and that also has a guide for the drinks container to be inserted into the receptacle that safely prevents tilting particularly on sharp transitions from a non-domed to a domed section of the movable element.

In a further preferred embodiment of the holding device according to the invention, the movable element has a circumferential margin in one plane that is essentially non-deformable. In an especially preferred embodiment, the flexible surface extends out from the enclosing plane of the circumferential margin. This gives rise to a flexible element that is particularly advantageously matched to the requirements placed on it. Thus the circumferential margin has the required stability of shape required for it to lie against the contact surface of the receptacle preferably without affecting the flexibility of the surface projecting out of the plane.

In a further preferred embodiment of the invention, the holding device is composed essentially completely of plastic. In particular this makes the construction of the holding device according to the invention especially easy and cost-efficient and furthermore the entire device can be cleaned especially easily particularly in a dishwasher.

BRIEF DESCRIPTION OF THE DRAWINGS

The present invention is explained in more detail in the following section on the basis of FIGS. 1 to 3 whereby these diagrams only illustrate example embodiments of the holding device according to the invention. The diagrams are not, however, suitable for limiting the general fundamental ideas of the invention in any way.

WAYS OF CARRYING OUT THE INVENTION

Figure 1:
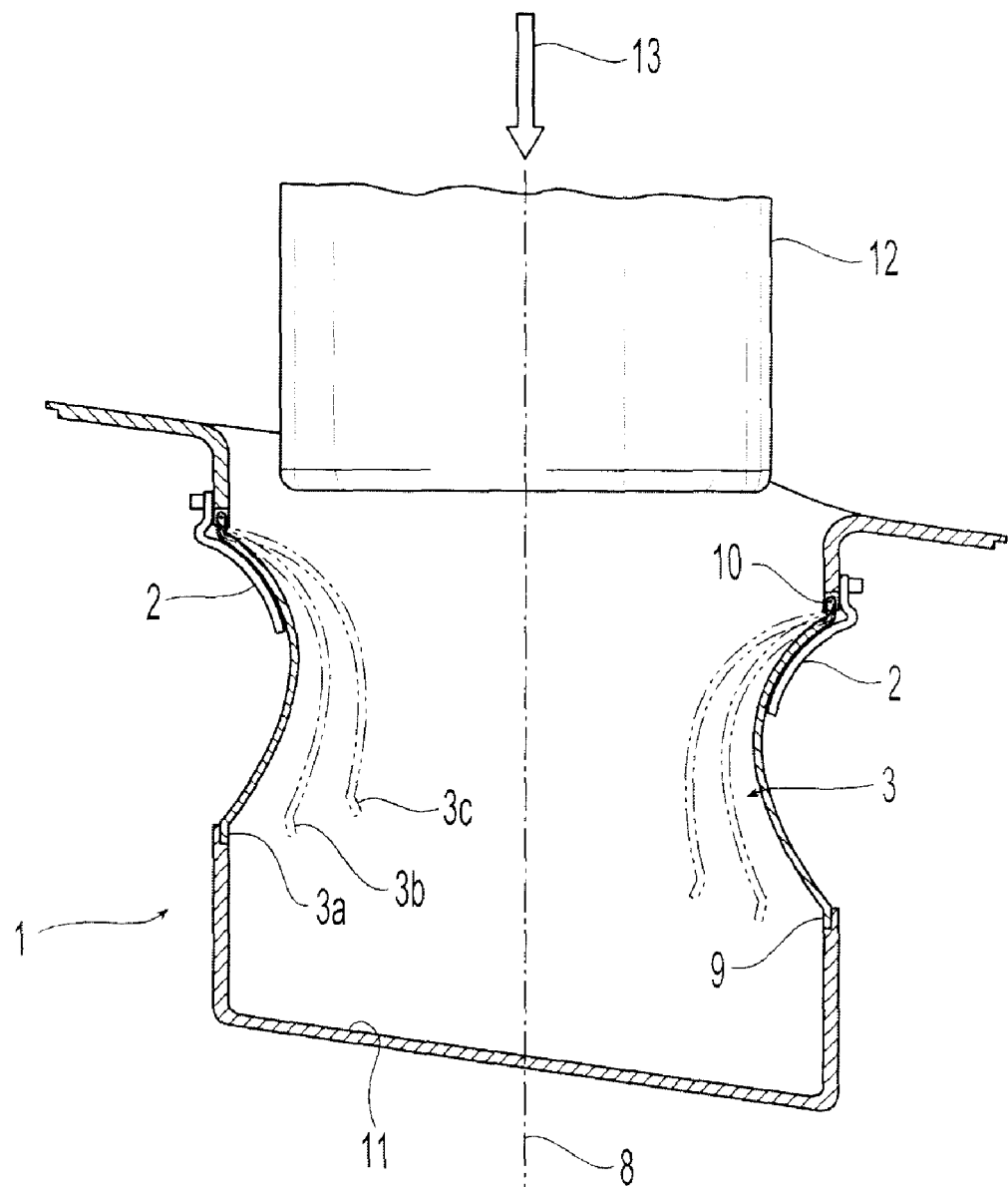
FIG. 1 shows a cross-sectional view of a holding device according to the invention.

FIG. 1 shows a cross-sectional view through a holding device 1 according to the invention. Holding device 1 is essentially symmetrical in design around axis of symmetry 8 and has a receptacle 4 with a supporting surface 11 for a drinks container 12 which is pushed into receptacle 4 in the direction of the arrow 13. Two holding mechanisms are represented opposite each other on the side walls of receptacle 4. The holding mechanisms consist in each case of a spring element 2, which is attached to receptacle 4 at the top of its face side, and a movable element 3. In this case spring element 2 is arranged on receptacle 4 such that its lower leg is pre-stressed and extends into receptacle 4. Due to its pre-stressing, spring element 2 presses movable element 3 into receptacle 4. Movable element 3 is arranged on receptacle 4 in such a way that it can rotate around hinge pin 10. In a first non-rotated position 3a, movable element 3 lies against contact surface 9 of receptacle 4. From this position 3a it can be moved into receptacle 4 by spring element 2 through an intermediate position 3b into a position 3c. If no drinks container 12 has been fitted into receptacle 4, movable element 3 remains in position 3c. Movable element 3 is only moved when a drinks container 12 is inserted and follows the geometry of drinks container 12 from position 3c into a position identified with the reference symbol 3b or 3a illustrated for example in FIG. 1. On removing drinks container 12 from holding device 1, movable element 3 returns to the starting position 3c together with spring element 2. Movable element 3 is merely represented in FIG. 1 as a section through its flexible surface 6; a section through the frame enclosing one plane (not illustrated) was omitted for the sake of the drawing's clarity, the frame is only indicated in the area where it is in contact with contact surface 9 of receptacle 4.

Figure 2:
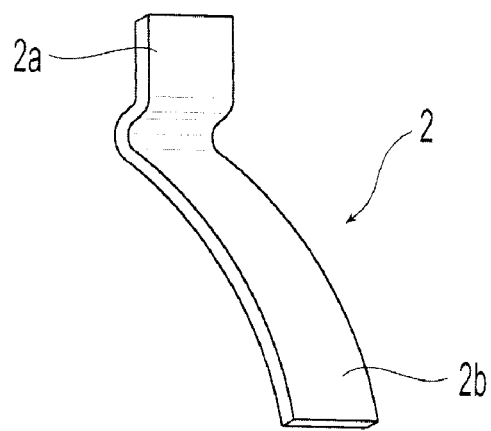
FIG. 2 shows a perspective view of a spring element according to the invention.

FIG. 2 shows a perspective view of a spring element 2. Spring element 2 has an upper leg 2a that can be attached to the receptacle (not illustrated). Spring element 2 also has a curved lower leg 2b, the curve of which essentially follows the dome of the movable element's flexible surface (not illustrated).

Figure 3:
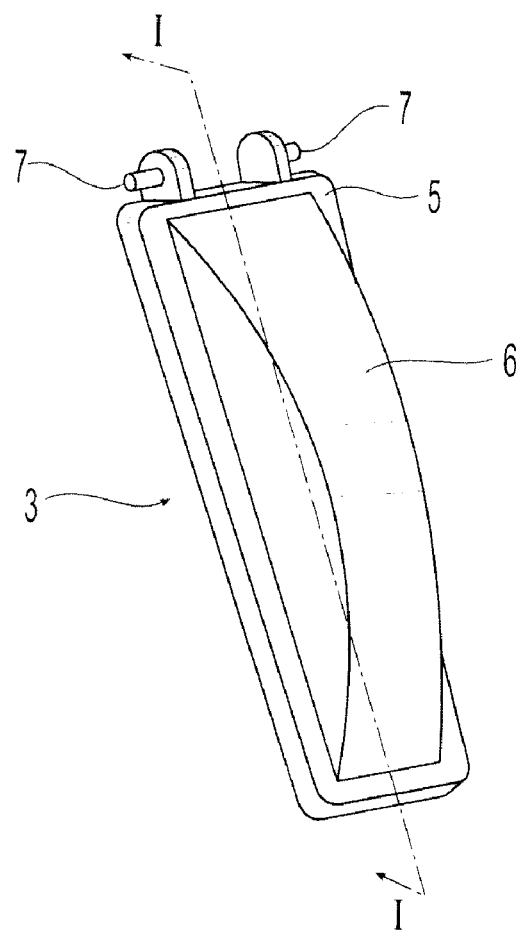
FIG. 3 shows a perspective view of a movable element according to the invention.

FIG. 3 shows a perspective view of a movable element 3. Movable element 3 has a circumferential margin 5 that is essentially designed to keep its shape and encloses one plane. A segmental arc shaped flexible surface 6, which is capable of being pressed in by a drinks container located in the receptacle, projects out of this plane. On its upper face side movable element 3 also has two bearing journals 7 that can locate in corresponding bearings on the receptacle (not illustrated) and thus ensure the rotatability of movable element 3.

What is claimed is:

1. A holding device (1) for receiving a drink container (12), comprising a receptacle (4) having a supporting surface (11) for the drink container (12) and at least one holding means disposed in an opening in an outer circumferential wall of the receptacle (4) wherein the holding means includes at least one curved spring element mounted in said receptacle and at least one curved movable element (3) rotatably mounted on said wall and pressed towards the inside of the receptacle (4) by said spring element (2) whereby the movable element (3) is rotatable about an axis (10) on the wall of the receptacle (4), the receptacle (4) has a contact surface (9) preventing outward movement of the movable element (3), and the movable element (3) has a domed flexible surface (6) extending into the receptacle (4).

2. A holding device (1) according to claim 1 wherein the receptacle (4) has a cylindrical shape.

3. A holding device (1) according to claim 1 wherein the side wall of the receptacle (4) has at least two openings opposite each other.

4. A holding device (1) according to claim 3 wherein the receptacle (4) has two identical holding means.

5. A holding device (1) according to claim 4 wherein the holding means are mounted in said openings opposite each other in the receptacle (4).

6. Holding device (1) according to claim 1, wherein the curved spring element (2) is made of plastic and connected to the receptacle (4) at one end with an opposite end extending inside said receptacle (4).

7. A holding device (1) according to claim 1 wherein the spring element (2) supports the movable element (3) within the receptacle.

8. A holding device (1) according to claim 1 wherein the movable element (3) rotates on bearings arranged on one end of said movable element (3) and on the receptacle (4).

9. A holding device (1) according to claim 1 wherein the flexible surface (6) of the movable element (3) has a segmental arc shaped dome.

10. A holding device (1) according to claim 1 wherein the movable element (3) has a substantially non-deformable circumferential margin (5) disposed in one plane.

11. A holding device (1) according to claim 10 wherein the flexible surface (6) extends out from the plane of the margin (5).

* * * * *